DAVID A. WILLIAMS
CHEN-HSIUNG YEN
CALVIN E. HARRIS
INVENTORS

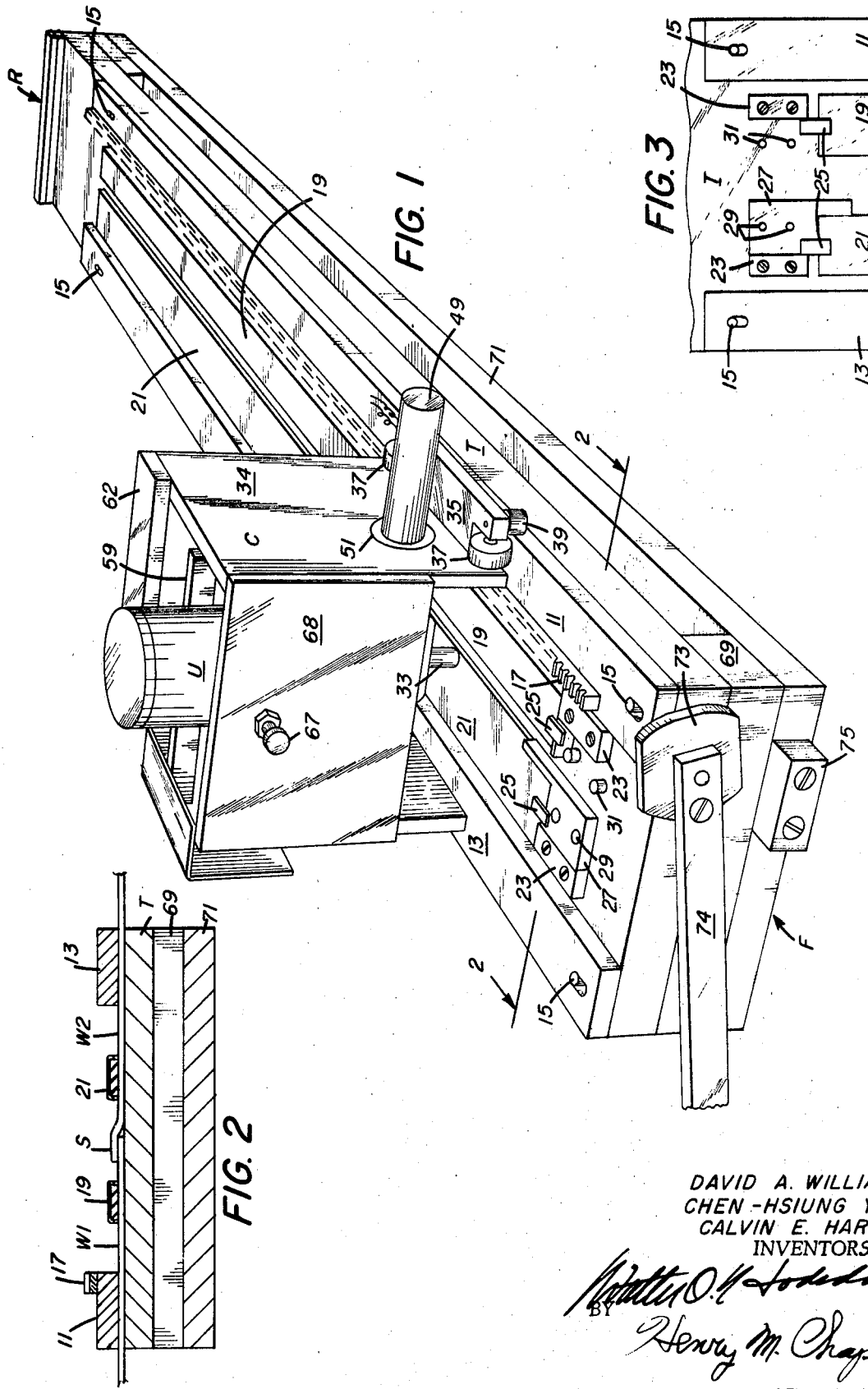

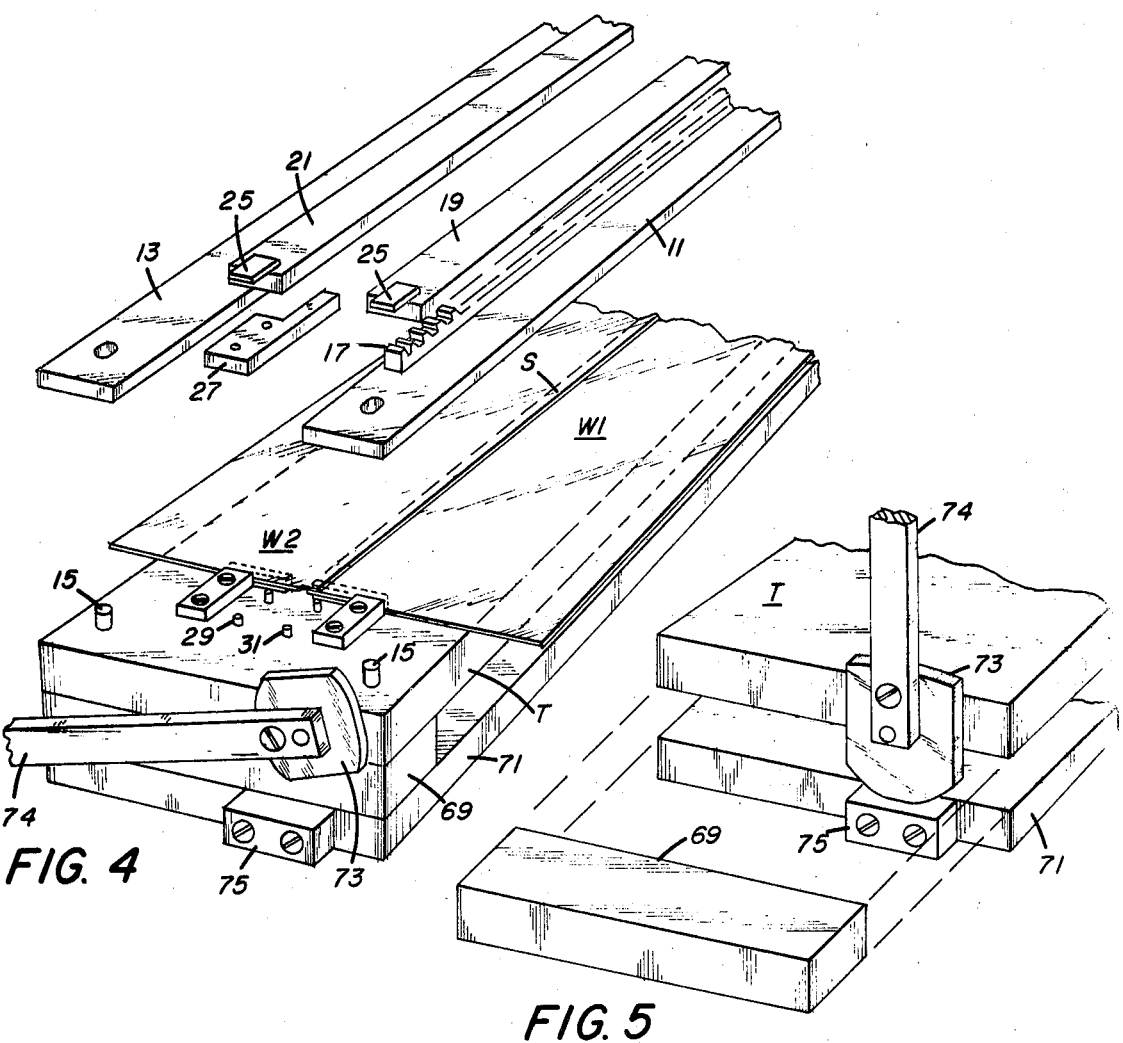
FIG. 4
FIG. 5
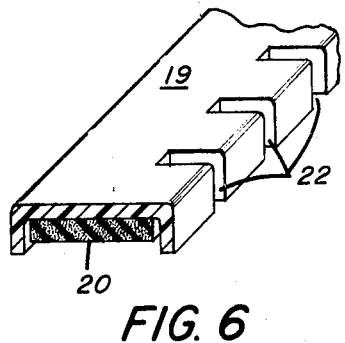
FIG. 6
DAVID A. WILLIAMS
CHEN-HSIUNG YEN
CALVIN E. HARRIS
INVENTORS
ATTORNEYS

ATTORNEYS

United States Patent Office 3,687,786
Patented Aug. 29, 1972

3,687,786
APPARATUS FOR SPLICING TOGETHER THE OVERLAPPING ENDS OF PHOTOGRAPHIC FILMS
David A. Williams, Fairport, and Chen-Hsiung Yen and Calvin E. Harris, Rochester, N.Y., assignors to Eastman Kodak Company, Rochester, N.Y.
Filed Aug. 5, 1970, Ser. No. 61,125
Int. Cl. B23k 1/06; B65h 69/06; G03d 15/04
U.S. Cl. 156—502
14 Claims

ABSTRACT OF THE DISCLOSURE

A simple and inexpensive apparatus for splicing two web ends such as photographic film, comprises a table, a pair of removable and replaceable tracks to be placed on top of the web, a pair of removable and replaceable magnetic clamping strips to be placed on top of the web between the tracks, a motor driven carriage movable along the tracks, and a pivoted ultrasonic transducer on the carriage having a floating horn for uniting the web ends. The carriage is driven by a motor actuated pinion gear which engages a rack on one of the tracks. Removable and replaceable abutment members are provided for properly positioning the clamping strips and the web ends. The table can be in the form of a cantilever to permit a loop of web to have its two ends spliced together.

CROSS-REFERENCE TO RELATED APPLICATIONS

Reference is made to commonly assigned copending U.S. patent application Ser. No. 762,207, now Pat. No. 3,556,912, entitled, "Ultrasonic Film Splicing Apparatus," filed on Sept. 16, 1968 in the names of Paul A. Burgo and Charles W. Pierson, and U.S. patent application Ser. No. 126,091, entitled "Method of and Apparatus for Ultrasonic Splicing," filed on Mar. 19, 1971 in the names of W. C. Wasco, C. W. Pierson and L. E. Pagnard.

BACKGROUND OF THE INVENTION

Field of the invention

The present invention relates to novel apparatus for rapidly and effectively splicing together two ends of a web material such as thermoplastic photographic film, for example, poly(ethylene terephthalate). This apparatus is especially adapted for the rapid splicing of films which may be only 0.004 inch thick or even thinner, and which may range in width from a few inches up to as much as 45 inches or greater.

Prior art

Ultrasonic sealing has been used for splicing together overlapping edges of photographic film, and suitable apparatus for heavy duty splicing is disclosed in U.S. application Ser. No. 762,207, now Pat. No. 3,556,912 which was filed Sept. 16, 1968 and is assigned to Eastman Kodak Company, also assignee of the present application. That apparatus has spliced satisfactorily, but is somewhat too expensive and complicated in design to justify its use for only occasional splicing of a relatively small number of webs. Consequently, there exists a need for a relatively simple and inexpensive splicing apparatus where relatively light duty is involved.

SUMMARY OF THE INVENTION

In accordance with the present invention there has been provided a novel apparatus of simple and inexpensive design for splicing together two ends of a web such as photographic film, which are arranged in overlapping relationship to form a seam. While this apparatus is intended primarily for ultrasonic splicing and thus employs an ultrasonic transducer having a horn which traverses the seam, the principles of the invention apply when splicing devices other than ultrasonic transducers are used, for example, heat sealing instruments.

Our novel apparatus comprises, in combination, a horizontal metal table which is adapted to receive web material to be spliced, with a seam extending along the table, and track means shown as a pair of spaced parallel elongated tracks on the table which are removable and replaceable on the table at will.

In addition, web clamping means shown as a pair of spaced parallel elongated web clamping strips are provided on the table between the tracks, and are also removable and replaceable at will. The reason for making these tracks and strips readily removable and replaceable is so that the web to be spliced can be positioned on the table, after which the tracks and the strips are positioned on top of the web so as to hold it firmly in position and to permit the splicing apparatus to traverse the seam.

Our novel apparatus also comprises means in the form of removable and replaceable abutment members for positioning the ends of web in a proper overlapping relationship for a splicing operation.

For the actual splicing operation there is provided a carriage which is movable along the parallel tracks, and which carries a floating ultrasonic transducer or other splicing device which is positioned between the clamping strips above the overlapped end edges of the web to be spliced, for uniting the overlapped ends as the carriage traverses the seam.

The mechanism for propelling the carriage along its tracks is extremely simple and economical in construction, and simple to operate. It comprises a motor driven pinion gear on the carriage which coacts with a longitudinally extending rack on one of the tracks. Simple mechanism is provided for selectively engaging or disengaging the pinion gear from the rack, so that the carriage can be moved freely along the table for proper positioning, after which the pinion gear can be engaged with the rack to conduct the splicing operation.

THE DRAWINGS

FIG. 1 is a perspective view showing splicing apparatus embodying the principles of the invention with certain portions thereof omitted for purposes of clarity;

FIG. 2 is a cross sectional view taken substantially along the line 2—2 in FIG. 1 and including overlapped webs to be spliced;

FIG. 3 is a fragmentary plan view of the back or far end of the apparatus shown in FIG. 1;

FIG. 4 is a fragmentary exploded perspective view of the front or near portion of the apparatus shown in FIG. 1;

FIG. 5 is a fragmentary perspective view of the front portion of the apparatus of FIG. 1, showing part of the table-supporting means removed from its normal position;

FIG. 6 is a perspective view, partly in cross section, showing a magnetic clamp for use in the splicing apparatus;

THE PREFERRED EMBODIMENTS

Figure 7:
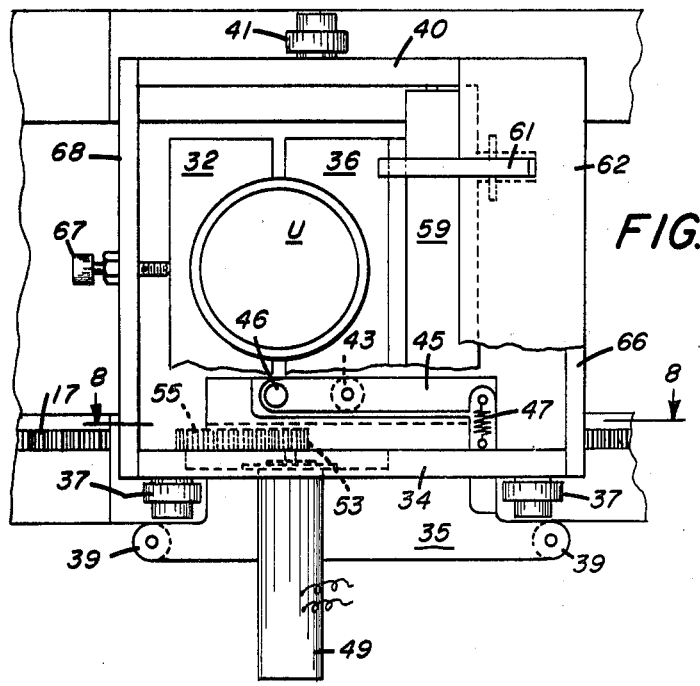
FIG. 7 is a plan view of the carriage shown in FIG. 1.

Referring to FIGS. 1 through 6 there is shown a long narrow table or anvil T of ferromagnetic material such as steel adapted to receive the web to be spliced, and having on its upper surface a pair of long narrow transversely spaced tracks 11 and 13 which are removably and replaceably held in position by studs 15 projecting from the table up through mating apertures at the near and far ends of the tracks. Track 11 carries on its upper surface an elongated rack 17 which extends along the inner edge of the track, and is enough narrower than the track to provide room for a carriage to pass along the track. Rack 17 can be bolted to track 11.

The table T also carries between the tracks a pair of spaced parallel magnetic web-clamping strips 19 and 21. As shown in FIG. 6, one type of clamping strip 19 is a steel channel member having an internal coextensive member 20 of flexible rubebr impregnated with magnetized iron particles (such as used on refrigerator doors, and readily available commercially). The edges of channel member 19 extend slightly below the bottom surface of member 20 so as to contact the film to be spliced. A plurality of transverse slots 22 in member 19 provide flexibility so that completely accurate flatness in machining is not needed, yet good seating on the film is obtained. Also, uniform clamping pressure is secured on film of varying thickness and width. Two pairs of abutment blocks 33 are provided on the table top to coact with the strips 19 and 21, and with bosses 25 carried on the ends of the strips, to properly position the strips on the table spaced slightly on either side of the central seam to be welded or spliced.

For positioning the web portions to be spliced with their end edges in precise overlapping relationship there are provided two spacer blocks 27, one at each end of the table. With tracks 11 and 13 and clamps 19 and 21 removed, blocks 27 are first positioned over studs 29, a first web W1 such as photographic film is placed against the blocks, and clamping strip 19 is applied on top of the web. Then the spacer blocks 27 are inverted over second pairs of studs 31, a second end of web W2 is placed against the blocks slightly overlapping the first end to form a seam S, and clamping strip 21 is applied on top of the web. Spacer blocks 27 are so proportioned as to be slightly short of the center line or seam to be spliced.

Tracks 11 and 13 can be positioned on top of the webs after both clamps have been applied, or one after each clamp.

Splicing is accomplished by means of an ultrasonic transducer U on a carriage C, having a downwardly projecting horn 33 with a lower end surface directly above the seam S to be spliced so as to be in contact with the web material as it traverses the seam. Transducer U is held between two half clamping blocks 32 and 36, one of which is pivotally supported by the carriage to permit the horn to float over the seam in a manner to be described.

With the horn 33 in a raised position (to be described more in detail hereinafter), the carriage C is moved to the front of the apparatus as shown in FIG. 1 so that the end of the horn is directly above the near edges of the overlapped webs W1 and W2. Then the horn 33 is lowered into contact with the seam and a motor-driven traversing mechanism (to be described more in detail hereinafter) on carriage C drives the carriage at a constant speed toward the far end of table T, while the vibrating horn 33 imparts its energy to the seam and causes the two webs to unite.

The carriage C comprises a box-shaped metal frame having a side wall 34 in which are horizontally journaled two wheels 37 to roll on the top of track 11. An outrigger 35 supports a pair of vertically journaled rollers 39 to roll along the vertical side of track 11. On its opposite side wall 40 carriage C has a horizontally journaled wheel 41 to run on the track 13.

Referring to FIG. 7, the carriage C has still another vertically journaled roller 43 for rolling on the inside vertical edge of track 11. Roller 43 is carried between the ends of a lever arm 45 which is fulcrumed at one end on a vertical pivot 46 on the inside of the carriage wall, and is drawn resiliently toward the wall by a spring 47 near the opposite end so as to assure proper retention and guidance of the carriage along the tracks.

Figure 8:
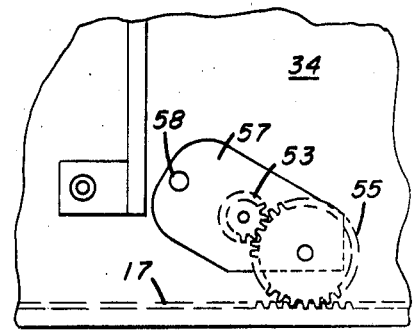
FIG. 8 is a fragmentary side elevational view of a part of the carriage as viewed from inside the carriage substantially from the line 8—8 in FIG. 7.
Figure 9:
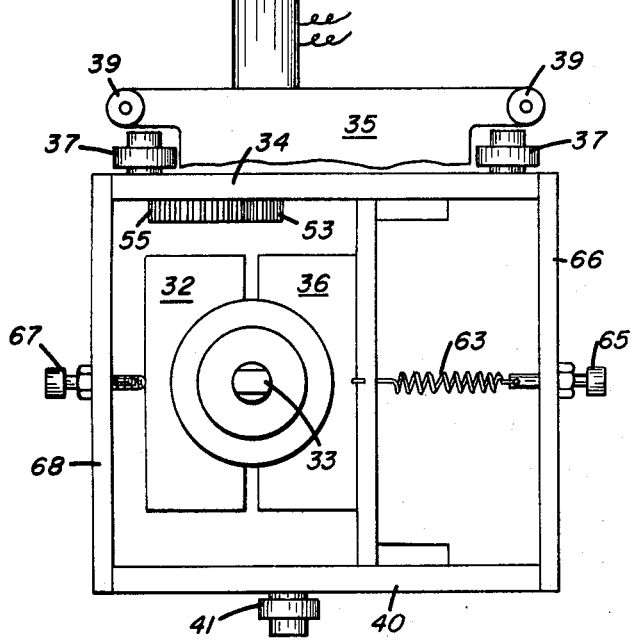
FIG. 9 is a view of the carriage as seen from the bottom in FIG. 1.

The carriage C is driven along table T by a small electric motor 49 which projects through an elliptical aperture 51 in the side wall 34, and at its inner end carries a small drive gear 53 (see FIGS. 7 to 9) which in turn drives a pinion gear 55 for engaging rack 17.

Motor 49 and drive gear 53 are carried by a lever arm 57 which is pivotally mounted on a horizontal pivot 58 on the inside of wall 34 of carriage C. Pinion gear 55 is journaled in the same lever arm 57 near the free end thereof so that upon raising or lowering motor 49 in aperture 51, the pinion gear 55 is raised up or lowered down, out of or into engagement with the rack 17.

Thus, when free movement of the carriage C along the table T is desired, the motor 49 is raised to disengage the pinion gear 55 and the carriage is moved freely to the desired position, for example the near edge of a seam to be welded. Then the motor 49 is lowered by the operator so the pinion gear engages rack 17, and the carriage C is motor driven toward the rear end of the table while the transducer U is electrically energized to weld the seam.

Figure 10:
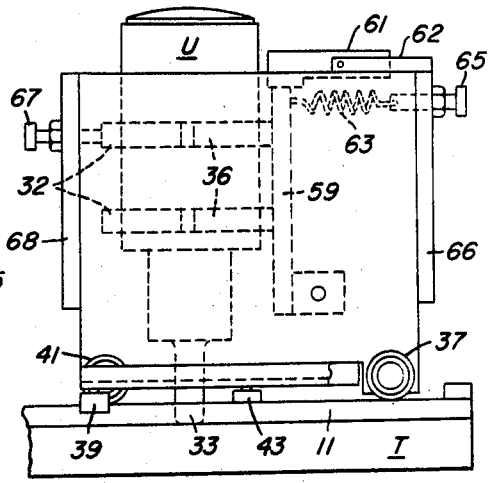
FIG. 10 is a schematic side elevational view showing how the transducer is mounted within the carriage.

To avoid damage to the horn 33 it is desirable that the horn only be in operating position close to (but spaced slightly from) the surface of table T when an actual splicing operation is to take place. Therefore, as best seen in FIG. 10, the clamping block 36 of transducer U is mounted on a hinge comprising a pivoted cross arm 59 whose ends are journaled in the side walls of carriage C. When the horn is to be shifted away from the table, it is swung up with the arm 59 until a latch 61 on a crosspiece 62 can be engaged with cross arm 59 to hold it in position against the force of a spring 63 whose tension is adjustable by means of a screw 65 in the end wall 66 of the carriage to give a desired static load to the transducer. To assure the proper positioning of horn 33 when in operating position, there is provided a set screw 67 in the opposite end wall 68 of the carriage against which the transducer abuts during a splicing operation. An important feature of the invention is that the hinged mounting of the transducer, which precedes the horn during a splicing operation, permits it to float so as to adjust to any slight irregularities in the surface at the splice.

The ends of two independent webs can be spliced together by the apparatus as described to this point. However, it is frequently desirable to form a loop from a single web whose opposite ends are then spliced together. In order to accommodate such a loop, table T is constructed in the form of a cantilever which is bolted together or otherwise fixed at its rear end R but is adapted to be free at its front end F. During a splicing operation table T must be firmly supported, and this is done at front end F by a block 69 which is located between table T and a lower support beam 71 which is spaced from table T. When a loop is to be formed, a rotatable cam 73 on the end of a lever 74 on table T is actuated against a boss 75 on beam 71 so as to raise table T slightly, whereupon the block 69 is withdrawn sideways in a direction parallel to the end of the table T. Table T and beam 71 remain spaced apart at front end F, and cam 73 is rotated a quarter turn unblocking the entrance and permitting the web to be slid in between table T and beam 71. Cam 73 is again turned against boss 75, block 69 is returned to its original position, cam 73 is again rotated a quarter turn, and the splicing operation is conducted. Alternatively, instead of removing block 69, one end of the web can be threaded through the space between 71 and T and the end block 69, and the ends of the web then overlapped to form the seam on top of the table. Upon completion of splicing, block 69 is removed so that the formed loop can be withdrawn from the apparatus. Of course, removal of the spliced loop also requires that the tracks 11 and 13, the clamping strips 19 and 21, and the spacer blocks 27 be removed from on top of the web.

The invention has been described in detail with particular reference to preferred embodiments thereof, but it will be understood that variations and modifications can be effected within the spirit and scope of the invention.

We claim:

1. An apparatus for splicing two ends of web arranged in overlapping relationship to form a seam, comprising, in combination:
    a table adapted to receive said web ends with said seam extending along said table;
    spaced apart track means mountable on said table and over said web ends, with said seam therebetween;
    spaced apart web clamping means mountable on said table between said track means and over said web ends with said seam therebetween;
    a carriage movable lengthwise along said track means; and
    splicing means on said carriage in splicing engagement with said seam for uniting the overlapping ends of said web to form a splice.

2. Apparatus in accordance with claim 1, wherein said track means comprises a pair of spaced, parallel, elongated tracks, and also comprising positioning means on said table coacting with said tracks and with said clamping means for positioning the web ends in precise overlapping relation.

3. Apparatus in accordance with claim 2 wherein said table is of magnetic material and said clamping means comprises a pair of spaced, parallel, elongated magnetic strips.

4. Apparatus in accordance with claim 3 wherein said clamping strips each comprises a channel shaped steel member and a flexible magnetic member therein, said channel member having transverse slots therein for flexibility.

5. Apparatus in accordance with claim 1 wherein said splicing means is an ultrasonic transducer.

6. Apparatus in accordance with claim 1, wherein said track means comprises a pair of spaced, parallel, elongated tracks, said clamping means comprises a pair of spaced parallel, elongated strips, said apparatus also comprising a pair of abutment members mountable on said table and spaced apart lengthwise of said clamping strips in position to act as stops for a first web end, means for holding said abutment members in a selected first position, and means for holding said abutment members in a selected second position in position to act as stops for a second web and to overlap said first web end.

7. Apparatus in accordance with claim 1, wherein said table comprises a support member and a table member spaced therefrom, said support and table members being secured together at one end and spaced apart at the opposite end to form a cantilever, whereby a loop of said web can be positioned around said table member for splicing.

8. Apparatus in accordance with claim 7, and further comprising supporting means for said opposite end of said table removable therefrom to form said cantilever, and replaceable thereon after said web is positioned for splicing.

9. Apparatus in accordance wtih claim 1, wherein said track means comprises a pair of spaced, parallel, elongated tracks, said clamping means comprises a pair of spaced, parallel, elongated strips, said apparatus also comprising:
    a rack on one of said tracks; and
    a motor-driven pinion on said carriage for coacting with said rack to propel said carriage.

10. Apparatus in accordance with claim 9 also comprising means on said carriage for moving said pinion into and out of engagement with said rack.

11. Apparatus in accordance with claim 10 wherein said last named means comprises an arm pivotally mounted on said carriage for movement up and down; said apparatus also comprising a motor having a shaft carrying said pinion, both said motor and said motor-driven pinion being carried by said arm and movable up and down therewith.

12. Apparatus in accordance with claim 1, wherein said carriage comprises wheels riding on the top surfaces of said tracks; and
    roller means engaging at least two side surfaces of at least one of said tracks.

13. Apparatus in accordance with claim 12 wherein said roller means comprises first and second rollers on opposite side surfaces of one of said tracks, and resilient mounting means for moving a first roller toward and away from a track.

14. Apparatus in accordance with claim 1, also comprising means mounting said splicing means on said carriage for movement toward and away from said table into and out of splicing position, said mounting means further comprising resilient means interposed between said splicing means and said carriage for causing said splicing means to float along the seam to compensate for variations in flatness of the seam.

References Cited
UNITED STATES PATENTS

| | | | |
|---|---|---|---|
| 3,556,912 | 1/1971 | Burgo et al. | 156—507 X |
| 3,508,989 | 4/1970 | Lawrence et al. | 156—73 X |
| 3,418,185 | 12/1968 | Balamuth et al. | 156—73 |

PHILIP DIER, Primary Examiner

U.S. Cl. X.R.

156—507, 580; 228—1